United States Patent
Gordon et al.

(10) Patent No.: US 11,216,238 B2
(45) Date of Patent: Jan. 4, 2022

(54) SCOPING THE LIFETIME OF PERSONAL DEVICES CONNECTED TO COMMUNAL COMPUTING DEVICES

(71) Applicant: Microsoft Technology Licensing, LLC, Redmond, WA (US)

(72) Inventors: John C. Gordon, Newcastle, WA (US); Corey Joseph Loman, Seattle, WA (US); Nabil Fates, Redmond, WA (US); Steven M. Ilami, Seattle, WA (US); Samuel David Adams, Bellevue, WA (US); Peter Gregory Davis, Kirkland, WA (US); Raju Jain, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/235,643

(22) Filed: Dec. 28, 2018

(65) Prior Publication Data

US 2020/0210129 A1    Jul. 2, 2020

(51) Int. Cl.
*G06F 3/147* (2006.01)
*G06F 9/451* (2018.01)

(52) U.S. Cl.
CPC .............. *G06F 3/147* (2013.01); *G06F 9/451* (2018.02)

(58) Field of Classification Search
CPC ........... G06F 3/147; G06F 9/451; G06F 21/34
See application file for complete search history.

(56) References Cited

U.S. PATENT DOCUMENTS

| 8,365,304 B2 | 1/2013 | Sebesta et al. |
| 2005/0107114 A1 | 5/2005 | Ocock |

(Continued)

FOREIGN PATENT DOCUMENTS

| CN | 104202379 A | 12/2014 |
| EP | 2802101 A2 | 11/2014 |

(Continued)

OTHER PUBLICATIONS

"Flash Drive Reminder", Brad Greco, available at https://web.archive.org/web/20080705101740/https://www.bgreco.net/reminder.php, Jul. 5, 2008, hereinafter "Flash".*

(Continued)

*Primary Examiner* — Matthew Ell
(74) *Attorney, Agent, or Firm* — Newport IP, LLC; Jacob P. Rohwer

(57) ABSTRACT

A communal computing device, like an interactive digital whiteboard, can detect the start and end of user sessions with the device. When a communal computing device detects the end of a user session, the it can determine if a personal device that was connected at the start of the user session or during the user session was also connected at the end of the user session. If so, the device can initiate actions based on the session start or end signals such as, but not limited to, transmitting a message to an organizer of a meeting scheduled during the time of the user session, transmitting a message to a participant of a meeting scheduled during the time of the user session, transmitting a message to an administrator, or generating a notification, such as a user interface reminding a user to take their personal device.

17 Claims, 9 Drawing Sheets

(56) References Cited

U.S. PATENT DOCUMENTS

| | | |
|---|---|---|
| 2006/0047783 A1* | 3/2006 | Tu .................... G06F 9/44505 |
| | | 709/220 |
| 2007/0233869 A1 | 10/2007 | Jodh et al. |
| 2009/0186603 A1* | 7/2009 | Usami ................ H04M 1/2757 |
| | | 455/414.2 |
| 2012/0117247 A1 | 5/2012 | Carruthers |
| 2012/0210364 A1 | 8/2012 | Lee et al. |
| 2013/0132613 A1 | 5/2013 | Chassot et al. |
| 2013/0283193 A1 | 10/2013 | Griffin |
| 2016/0125205 A1 | 5/2016 | Vajravel |
| 2019/0073178 A1* | 3/2019 | Laidlaw ................ G06F 3/1423 |

FOREIGN PATENT DOCUMENTS

| | | |
|---|---|---|
| JP | 2012118859 A | 6/2012 |
| JP | 5343471 B2 | 11/2013 |

OTHER PUBLICATIONS

"Get a Reminder to Unplug Your USB Flash Drive from the Computer", Amit Agarwal, Jul. 4, 2008, available at https://www.labnol.org/software/tutorials/get-reminder-remove-usb-flash-drive-from-computer/3784/.*

Michael Pietroforte, "Never Forget Your USB-stick Again", Mar. 28, 2006, https://4sysops.com/archives/never-forget-your-usb-stick-again/).*

"International Search Report and Written Opinion Issued in PCT Application No. PCT/US19/067710", dated Feb. 27, 2020, 12 Pages.

* cited by examiner

SCOPING THE LIFETIME OF PERSONAL DEVICES CONNECTED TO COMMUNAL COMPUTING DEVICES

BACKGROUND

Communal computing devices are commonly utilized in the workplace, public areas, and other types of environments. For example, a communal computing device, such as an interactive digital whiteboard, might be installed in a conference room of an enterprise. Employees of the enterprise can utilize the communal computing device individually or in collaboration with one another. Other examples of communal computing devices include, but are not limited to, a shared computer in a library, classroom, or other public location. During a typical day, many different types of users might utilize a communal computing device sequentially.

Users frequently connect their own personal devices to communal computing devices. For example, a user of a communal computing device might connect a storage device, like a universal serial bus ("USB") flash drive, to the communal computing device in order to access a presentation or another type of content stored thereon. As another example, a user might connect a wireless device, such as a wireless headset, wireless mouse, wireless keyboard, or digital pen, to a communal computing device.

Personal devices such as those described above are generally available as system-wide resources on communal computing devices. All users of communal computing devices can utilize connected personal computing devices, even when the user that initially connected a personal device logs out of a communal computing device. This, however, can create technical issues including, but not limited to, security issues and privacy issues. Maintaining a connection to a personal device after a user completes their session with a communal computing device can also result in the unnecessary utilization of computing resources, such as memory and processor cycles.

It is with respect to these and other technical challenges that the disclosure made herein is presented.

SUMMARY

Technologies are disclosed herein for scoping the lifetime of personal devices connected to communal computing devices based on user sessions. Implementations of the technologies disclosed herein can improve the security of communal computing devices and the privacy of users utilizing communal computing devices. The disclosed technologies can also reduce the utilization of computing resources, such as memory and processor cycles, as compared to previous communal computing devices by closing connections to personal devices after users have completed sessions with a communal computing devices. Other technical benefits not specifically identified herein can also be realized through implementations of the disclosed technologies.

In order to realize the technical benefits mentioned briefly above, and potentially others, a communal computing device, such an interactive digital whiteboard, can detect the start of user sessions with the device. In one configuration, for example, a communal computing device can detect session start signals that indicate the start of a user session. The session start signals can include, but are not limited to, an indication that a user has signed into a communal computing device, an indication that a user has been detected in the vicinity of a communal computing device, biometric identification of a user in the vicinity of a communal computing device, a connection of a personal device, or an indication of the start time of a meeting scheduled at a communal computing device.

As discussed briefly above, users can connect their personal devices to a communal computing device during user sessions. For example, and without limitation, users might connect storage devices, such as USB flash drives, secure digital ("SD") cards, and other devices capable of storing user data. Users might also connect wired or wireless user input devices such as, but not limited to, mice, keyboards, digital pens, digital gloves, and joysticks. Users might also connect wired or wireless audio and communication devices such as, but not limited to, wireless telephones, wireless headsets, or microphones.

In some configurations, a communal computing device might ask a user to identify themselves at the time a request is made to connect a personal device to the communal computing device after a user session has started. For example, if a user connects a USB flash drive to a communal computing device, the communal computing device might present a user interface to the user through which they can identify and/or authenticate themselves. In these configurations, the communal computing device can store data identifying the user and the connected personal device. As will be described in greater detail below, this data can be used to initiate an action directed to the specific user and the personal device if the user leaves the device connected to the communal computing device after their user session has ended. This data can also be utilized to customize UIs relating to the personal device, such as UIs for interacting with the personal device, based upon the identity of the user associated with the personal device.

A communal computing device implementing the disclosed technologies can also detect the end of user sessions with the device. In one configuration, for example, a communal computing device can detect session end signals that indicate the end of a user session. The session end signals can include, but are not limited to, a request to clear a user workspace on a communal computing device, expiration of an inactivity timer, an indication that no users are present in the vicinity of a communal computing device, or a signal indicating an end time of a meeting scheduled at a communal computing device.

When a communal computing device detects the end of a user session, the communal computing device can determine if a personal device that was connected to the communal computing device after the start of the user session was connected to the communal computing device at the end of the user session. If so, the communal computing device can initiate actions based on the session start signals or session end signals. For example, and without limitation, the communal computing device might restrict access to the personal device from applications or other programs. In this way, applications, and users, will not be able to access the contents of the personal device following the end of a user session.

When the end of a user session is detected, a communal computing device might also, or alternately, transmit a message to an organizer of a meeting scheduled at the communal computing device during the time of the user session, transmit a message to a participant of a meeting scheduled at the communal computing device during the time of the user session, transmit a message to an administrator of a communal computing device, or generate a notification at the communal computing device, such as a user interface reminding a user to take their personal device with them. The particular actions performed by the communal computing device can be selected based upon the identity of an authenticated user associated with the personal device or other factors.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
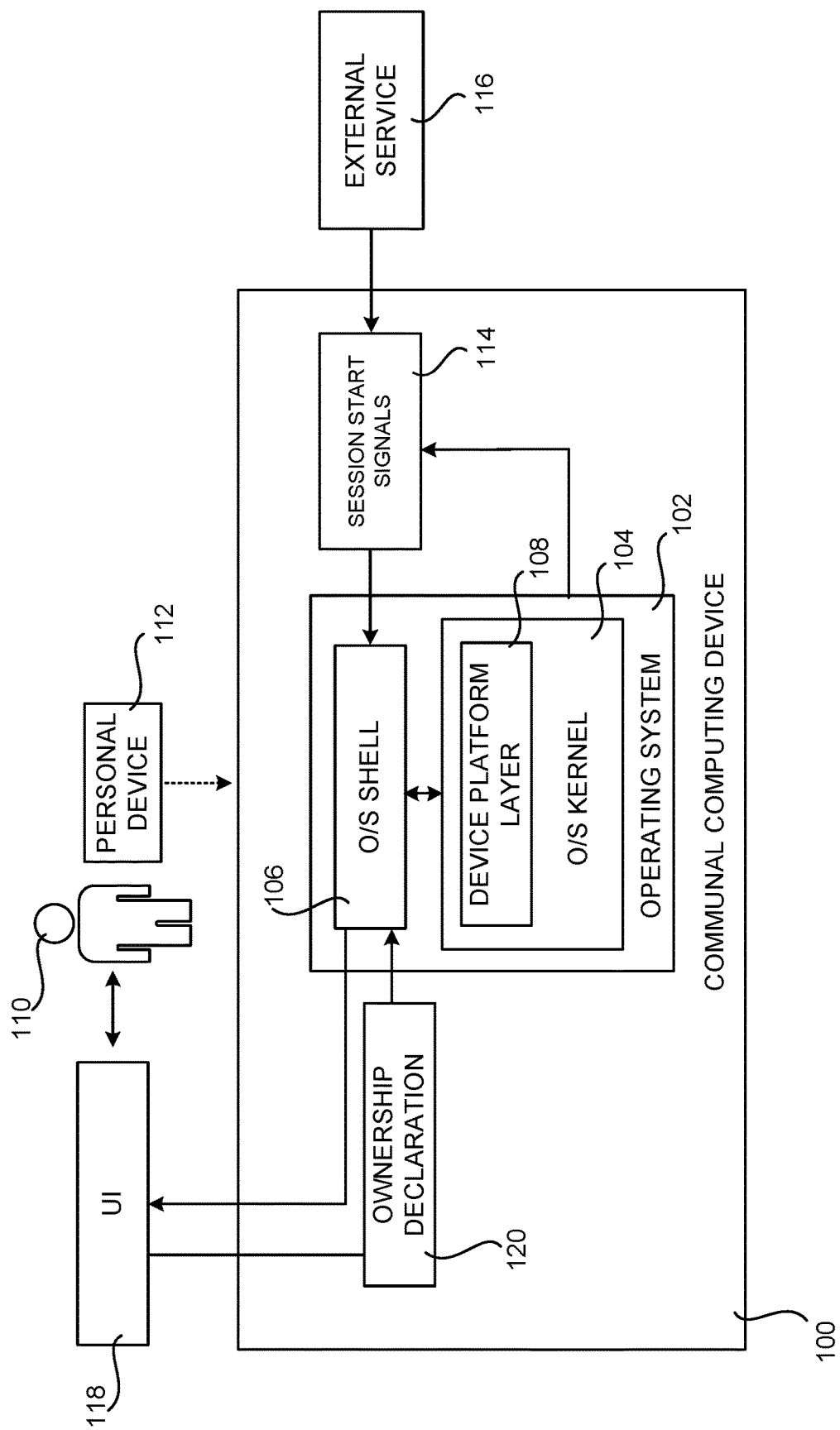
FIGS. 1A and 1B are computing architecture diagrams showing aspects of a communal computing device configured for scoping the lifetime of connected personal devices based on user sessions.

The following detailed description is directed to technologies for scoping the lifetime of connected personal devices connected to communal computing devices based on user sessions. As discussed briefly above, the disclosed technologies can improve the security of communal computing devices and the privacy of users that utilize communal computing devices. The disclosed technologies can also reduce the utilization of computing resources by communal computing devices. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of a communal computing device 100 configured for scoping the lifetime of connected personal devices based on user sessions will be described.

Figure 1B:
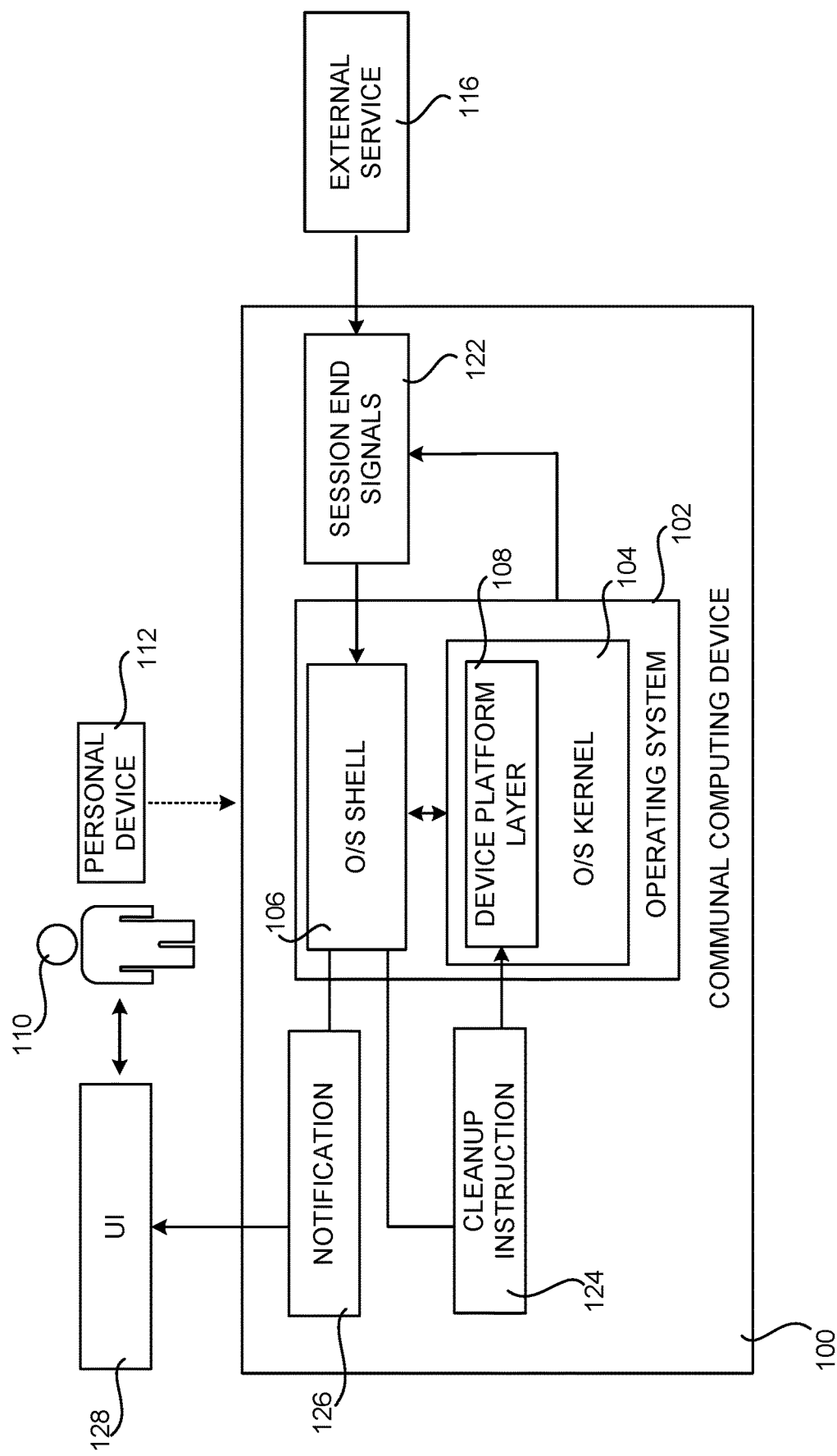

FIGS. 1A and 1B are computing architecture diagrams showing aspects of a communal computing device 100 configured for scoping the lifetime of connected personal devices based on user sessions. The communal computing device 100 might be an interactive digital whiteboard such as that shown in FIGS. 2A-2C and described below. Such a device might be installed in a communal area, such as a conference room of an enterprise. Employees of the enterprise can utilize the digital whiteboard individually or in collaboration with one another simultaneously. In this regard, it is to be appreciated that while an interactive digital whiteboard is utilized herein to illustrate aspects of the disclosed subject matter, those skilled in the art will recognize that the disclosed technologies can be implemented by other types of communal computing devices 100 including, but not limited to, public kiosks or computers, hand-held computing devices, consumer electronics, wearable computing devices, automobiles, home automation devices, video game consoles, desktop and laptop computers, tablet computers, and the like.

As shown in FIG. 1A and described briefly above, the communal computing device 100 is configured for scoping the lifetime of connected personal devices based on user sessions. In order to provide this functionality, the communal computing device 100 executes an operating system 102. The operating system 102 enables multiple authenticated or non-authenticated users to utilize the communal computing device 100 simultaneously.

As mentioned briefly above, users 110 of communal computing devices 100 commonly connect their own personal devices 112 to communal computing devices 100 located in common areas. A personal device 112 is a device that is associated with or owned by a particular user 110. For example, a guest or authenticated user 110 of a communal computing device 100 might connect a storage device, like a USB flash drive, to a communal computing device 100 in order to access a presentation or another type of content stored thereon. As another example, a guest or authenticated user 110 might connect a wireless device, such as a wireless headset, wireless mouse, wireless keyboard, or digital pen, to a communal computing device. Other types of personal devices 110 include, but are not limited to: other types of storage devices, such as secure digital ("SD") cards or external hard drives; wired or wireless user input devices such as, but not limited to, digital gloves, joysticks, or other types of game controllers; and wired or wireless audio and communication devices such as, but not limited to, wireless telephones and microphones.

In order to support the connection and utilization of personal devices 112 such as those mentioned above, the operating system 102 includes a device platform layer 108. The device platform layer 108 executes as a part of an operating system kernel 104 and manages the establishment of connections to personal devices 112 and the closing of these connections. The device platform layer 108 makes connected personal devices 112 available as system-wide resources on communal computing devices 100. As a result, all users of communal computing devices 100 can utilize connected personal computing devices 112, even when the user that initially connected a personal device 112 logs out of a communal computing device 100. As discussed above, this can create technical issues including, but not limited to, security and privacy issues. Maintaining a connection to a personal device 112 after a user 110 completes their session with a communal computing device 100 can also result in the unnecessary utilization of computing resources, such as memory and processor cycles.

Detecting the Start of User Sessions

In order to address the technical challenges described above, and potentially others, a communal computing device 100, such as an interactive digital whiteboard, is provided that can detect the start of user sessions with the device 100. In one configuration, for example, a communal computing device 100 can detect or receive session start signals 114 that indicate the start of a session with the device. The session start signals 114 can include, but are not limited to, an indication that a user 110 has signed into a communal computing device 100. For example, in one configuration an operating system shell 106 provides a UI 118 through which a user 110 can authenticate themselves (e.g. provide a login and password). The operating system shell 106 is a software component that provides a graphical user interface ("GUI") for accessing the services provided by the operating system 102.

In some configurations, the communal computing device 100 can ask a user 110 to identify themselves at the time a request is made to connect a personal device 112 to the communal computing device 100 after a user session has started. For example, if a user 110 connects a USB flash drive to a communal computing device 100, the communal computing device 100 might present a UI 118 to the user 110 through which the user 110 can identify and/or authenticate themselves. In this way, the user 110 is providing an ownership declaration 120 to the communal computing device 100 indicating that they are the owner of the personal device 112 to be connected to the communal computing device 100. In some configurations, the personal device 112 is inaccessible until the user 110 provides the ownership declaration 120.

Once a user 110 has provided an ownership declaration 120, the communal computing device 100 can store data identifying the user 110 and the connected personal device 112. As will be described in greater detail below, this data can be used to initiate an action with respect to the particular user 110 and the personal device 112 if the user 110 leaves the device 112 connected to the communal computing device 100 after the user session has ended. This data can also be utilized to customize UIs relating to the personal device 112, such as UIs for interacting with the personal device 112, based upon the identity of the user 110 associated with the personal device 112. Additional details regarding these aspects will be provided below.

Other examples of session start signals 114 include, but are not limited to, an indication that a user has been detected in the vicinity of a communal computing device 100 (e.g. by using an infrared emitter and camera) or biometric identification (e.g. fingerprint or face recognition) of a user 110 in the vicinity of a communal computing device 100. In order to provide this functionality, the communal computing device 100 can be equipped with various types of sensors (not shown in FIG. 1A) including, but not limited to, fingerprint readers, color or black and white video cameras, structured light projectors, infrared emitters and cameras, ambient light sensors, and microphone arrays. The communal computing device 100 can include other or alternate sensors for detecting the presence of a user 110 or biometrically authenticating a user 110.

An indication of the start time of a meeting scheduled at a communal computing device 100 can also act as a session start signal 114. For example, and as shown in FIG. 1A, an external service 116 for scheduling meetings between users 110 of a communal computing device 100 can provide a session start signal 114 to the communal computing device 100 indicating the start time of a meeting scheduled at the communal computing device 100. Other types of session start signals 114 can be provided from other types of external services 116 in other configurations.

Connection of a personal device 112 to the communal computing device 100 can also indicate the start of a user session with the device. In this way, actions such as those described below can be taken with respect to personal devices 112 connected to a communal computing device 100 even when they are connected prior to user's interacting with the communal computing device 100. It is to be appreciated that the session start signals 114 described above are merely illustrative and that other signals indicating the start of a user session with a communal computing device 100 can be used in other configurations.

Detecting the End of User Sessions

As shown in FIG. 1B and described briefly above, the communal computing device 100 can also detect the end of user sessions with the device. In one configuration, for example, a communal computing device can detect session end signals 122 that indicate the end of a user session. The session end signals 122 can include, but are not limited to, a request to clear a user workspace on a communal computing device 100. For instance, a user 110 might request through a UI 128 that the contents of their workspace on the communal computing device 100 be cleared. In response thereto, the communal computing device can delete any data on the communal computing device 100 associated with the user 110.

The expiration of an inactivity timer (not shown in FIG. 1B) can also be utilized as a session end signal 122. The inactivity timer can be set to expire after a predetermined amount of time has elapsed since a user 110 last interacted with the communal computing device 100. Expiration of such a timer can act as a session end signal 122 indicating that a user session with the communal computing device 100 has ended.

An indication that no users are present in the vicinity of a communal computing device 100 can also act as a session end signal 122. For example, and without limitation, the communal computing device 100 can utilize sensors, such as an infrared emitter and camera, to detect when users are in its vicinity (e.g. within the same conference room or public space). If no users 110 are detected in the vicinity, the communal computing device 100 considers the previous user session to have ended.

A signal indicating an end time of a meeting scheduled at a communal computing device 100 can also act as a session end signal 122. As in the example given above, for instance, an external service 116 for scheduling meetings between users 110 of a communal computing device 100 can provide a session end signal 122 to the communal computing device 100 indicating the end time of a meeting scheduled at the communal computing device 100. Other types of session end signals 122 can be provided from other types of external services 122 in other configurations. In this regard, it is to be appreciated that the session end signals 122 described above are merely illustrative and that other signals indicating the end of a user session with a communal computing device 100 can be used in other configurations.

In some configurations, machine learning techniques can be utilized to learn a model for use in predicting the start and end of user sessions. Once trained, the model can predict the start and end of user sessions based upon user interactions with the communal computing device 100. For instance, a decision to notify a user to remove their personal device 112 may be made when an application closes that had access to a file handle on a USB stick, or when a meeting closes during which a BLUETOOTH headset was utilized. This decision may be made based on a trained model defined by device usage activity on the communal computing device 100 itself.

The trained model can be implemented as a Hidden Markov Model ("HMM") or another type of learned model capable of predicting that a device is likely to be used for a period of time following the occurrence of an event (e.g. to predict that an event is a session start signal) and that a device is likely to go unused after an event occurs (e.g. to predict that an event is a session end signal). The identified events can then be utilized as session start signals 114 and session end signals 116 in the manner described herein.

Detection of Connected Personal Devices at the End of User Sessions

When the communal computing device 100 detects the end of a user session, the communal computing device 100 can determine if a personal device 112 that was connected to the communal computing device 100 at the beginning of or during a user session was also connected to the communal computing device 100 at the end of the user session.

If the communal computing device 100 determines that a personal device 112 remains connected at the end of a user session, the operating system shell 106 can issue a clean-up instruction 124 to the device platform layer 108. In response thereto, the device platform layer 108 can perform cleanup operations for the personal device 112 such as, but not limited to, ejecting, unpairing, or otherwise disconnecting the personal device 112 from the communal computing device 100. In this way, other users 110 of the communal computing device 100 will be unable to use the personal device 112. The communal computing device 100 might also provide a visual or audible notification 126 in a UI 128, for example, indicating that the personal device 112 remains connected and reminding the user 110 to take their personal device 112.

Initiating Actions for Personal Devices that Remain Connected Following User Sessions If the communal computing device 100 determines that a personal device 112 remains connected at the end of a user session, the communal computing device 100 can also initiate other types of actions based on the session start signals or session end signals described above. For example, and without limitation, the communal computing device 100 might restrict access to the personal device 112 from applications or other programs. In this way, applications, and users, will not be able to access the contents of the personal device 112 following the end of a user session.

If a personal device 112 remains connected at the end of a user session, the communal computing device 100 might also, or alternately, transmit a message (not shown in FIG. 1B) to an organizer of a meeting scheduled at the communal computing device 100 during the time of the user session. The external service 116 can provide contact information, such as an e-mail or instant messaging address, for the meeting organizer to the communal computing device 100. The message might indicate that the personal device 112 was left connected to the communal computing device 100 at the end of a user session and request that the meeting organizer return to the communal computing device 100 to retrieve the personal device 112.

In a similar fashion, the communal computing device 100 can transmit a message (not shown in FIG. 1B) to a participant in a meeting scheduled at the communal computing device 100 during the time of the user session. As in the example above, the external service 116 can provide contact information, such as an e-mail or instant messaging address, for the meeting participant to the communal computing device 100. The message sent by the communal computing device 100 might indicate that the personal device 112 was left connected to the communal computing device 100 at the end of a user session and request that the meeting participant return to the communal computing device 100 to retrieve the personal device 112.

The communal computing device 100 might also, or alternately, transmit a message (not shown in FIG. 1B) to an administrator user of the communal computing device 100 in response to detecting the presence of a personal device 112 at the end of a user session. As in the examples described above, the message sent by the communal computing device 100 might indicate that the personal device 112 was left connected to the communal computing device 100 at the end of a user session and request that the administrator retrieve the personal device 112.

In some configurations, the particular action, or actions, performed by the communal computing device 100 can be selected based upon the identity of an authenticated user associated with the personal device 112 or other factors. For instance, if a user 110 has authenticated at the time a personal device 112 is connected to the communal computing device 100 and provides an ownership declaration 120, the communal computing device 100 can send a message directly the user 110 if the user 110 forgets to take the personal device 112 with them at the conclusion of their user session. Other types of actions can be initiated based on the identity of an authenticated user 110 that has provided an ownership declaration 120 for a personal device 112. Additional details regarding the operation of the communal computing device 100 will be provided below with regard to FIGS. 2A-5.

In some configurations, information regarding a personal device 112 left at a communal computing device 100 following a user session can be saved and made available through a notification channel, such as a network service or web site. In this configuration, the communal computing device 100 can provide a notification to a network service with the information. For example, the communal computing device 100 might transmit information to the network service including, but not limited to, data indicating the date and time at which the personal device 112 was connected, the meeting during which the personal device was connect, if any, data describing the personal device 112 (e.g. the brand or type of device), and the location of the communal device 100 to which the personal device 112 was connected. The network service might also allow users to supply information indicating that they removed the personal device 112 following a user session and indicating where the personal device can be retrieved 112. Users can access the information described above through various mechanisms, such as through a web site, to obtain information about their personal device 112 and to identify the individual that removed their device from the communal computing device 100. The user can then retrieve their personal device from the appropriate user.

Figure 2A:
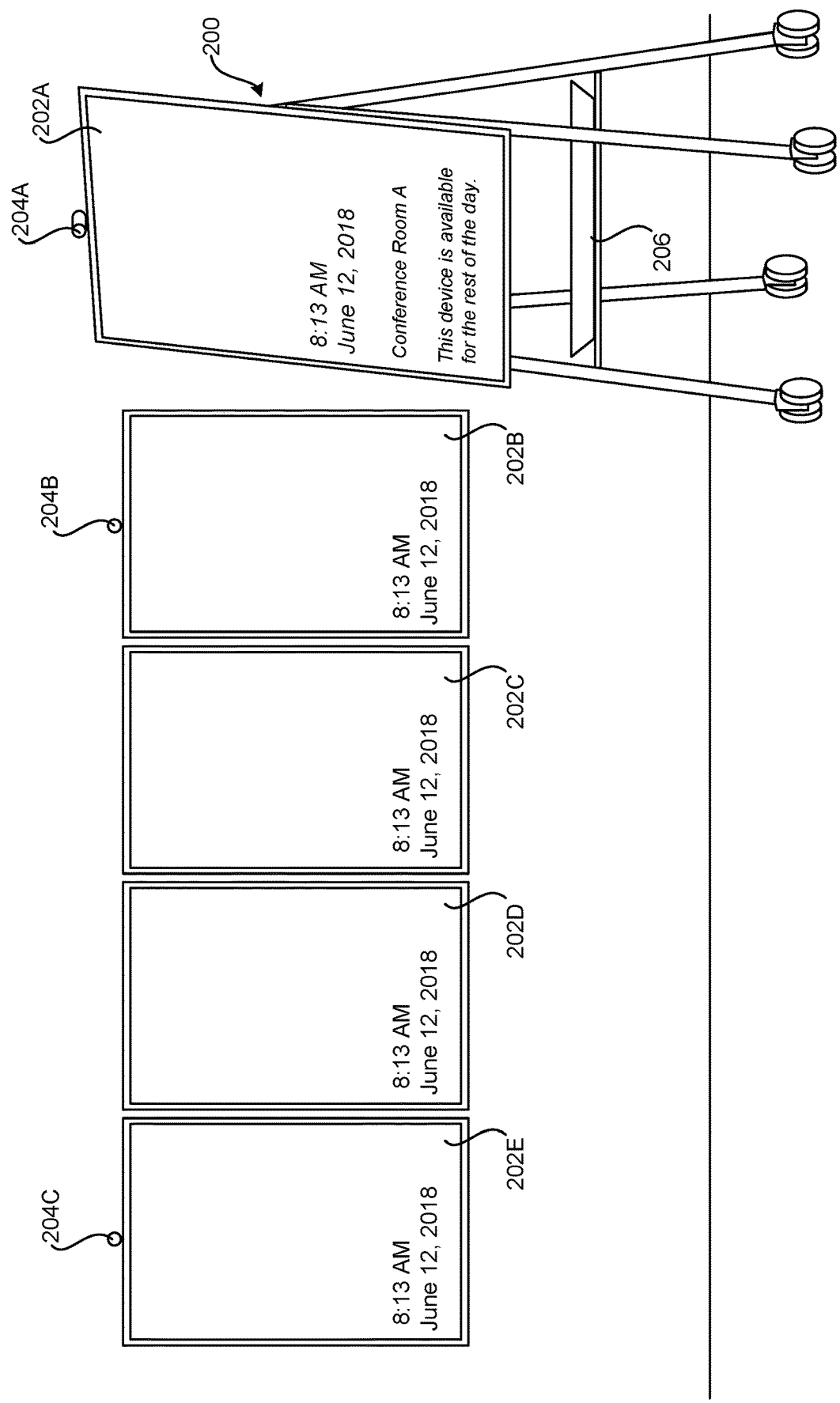
FIGS. 2A-2C are pictorial diagrams showing aspects of an interactive digital whiteboard configured for scoping the lifetime of connected personal devices based on user sessions.
Figure 2B:
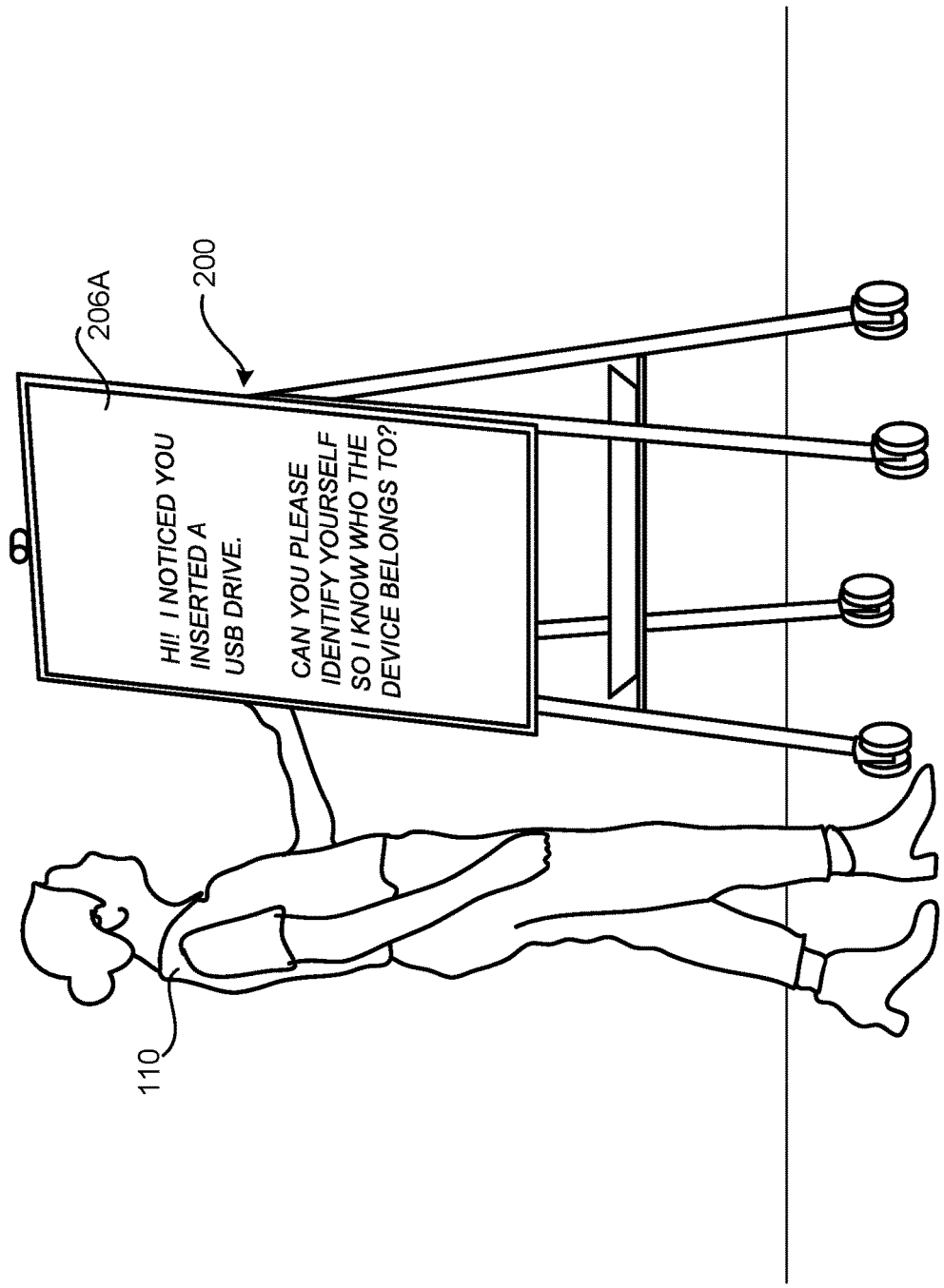
Figure 2C:
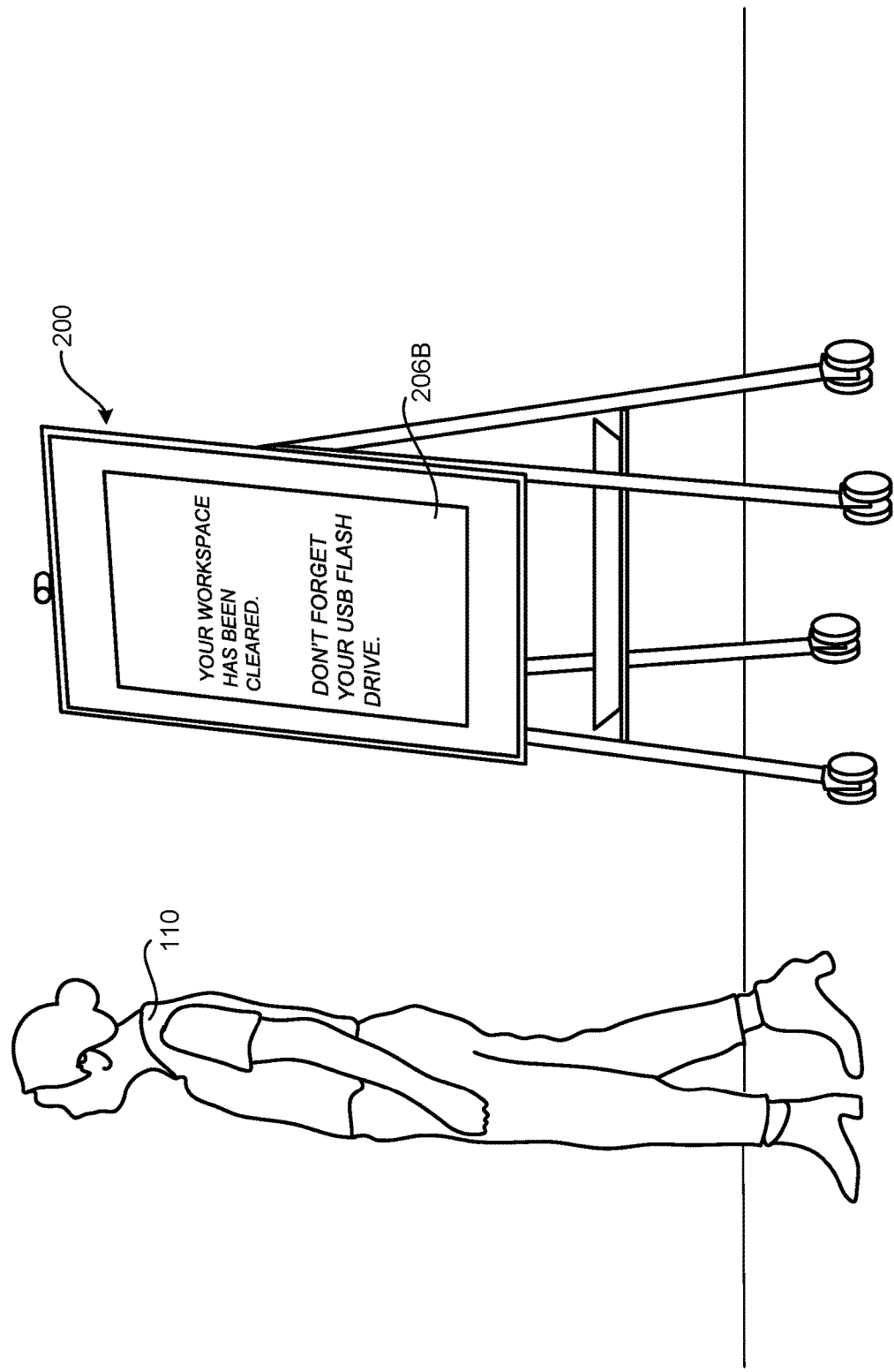

FIGS. 2A-2C are pictorial diagrams showing aspects of an illustrative communal computing device 100 and the functionality that it provides. In the example illustrated in FIGS. 2A-2C, the communal computing device 100 is an interactive digital whiteboard 200. The illustrative interactive digital whiteboard 200 shown in FIGS. 2A-2C includes a roller-stand-mounted display 202A and four wall-mounted displays 202B-202E. The interactive digital whiteboard 200 also includes three video cameras 204A-204C. The video cameras 204A-204C can be utilized to recognize users 108 in the vicinity of the interactive digital whiteboard 200, for videoconferencing, and for other purposes.

The interactive digital whiteboard 200 also includes a computer 206, which might be interfaced to various hardware components such as, but not limited to, a microphone array, ambient light and infrared presence sensors, fingerprint sensors, the displays 202A-202E, the video cameras 204A-204C, wired and wireless networking devices, and other input devices and hardware components. The computer 206 also includes one or more general-purpose processors, graphics processors, memory, and volatile and non-volatile storage devices. The computer 206 can support execution of an operating system 102 to provide aspects of the functionality disclosed herein.

In the example illustrated in FIG. 2B, a user 110 has inserted a USB drive into an appropriate port on the interactive digital whiteboard 200. In this example, the interactive digital whiteboard 200 has provided a UI 206A asking the user 110 to identify themselves in order to create an association between the connected USB drive and the user 110. As mentioned above, the interactive digital whiteboard 200 can consider the insertion of the USB drive as a session start signal 114.

As discussed above, in some configurations the interactive digital whiteboard 200 can request an ownership declaration 120 from a user 110 in order to take a user-specific action if a personal device 112 is connected to the interactive digital whiteboard 200 at the conclusion of a user session. In this regard, it is to be appreciated that it is not required for users 110 to authenticate with the interactive digital whiteboard 200 or provide an ownership declaration 120. If, however, a user 110 does provide an ownership declaration 120, the interactive digital whiteboard 200 can initiate user-specific actions in the event the user 110 leaves their personal device 112 at the conclusion of a user session.

Continuing the example from FIG. 2B, FIG. 2C illustrates a scenario where the user 110 has requested to clear their workspace. When a user 110 requests to clear their workspace, the interactive digital whiteboard 200 can delete any data associated with the user 110 stored thereupon. As also mentioned above, a request to clear a user workspace can also be considered a session end signal 122. Accordingly, the interactive digital whiteboard 200 can initiate one or more actions with respect to personal devices 112 that remain connected. In the example shown in FIG. 2C, for instance, the interactive digital whiteboard 200 has presented a UI 206B reminding the user 110 to take their USB flash drive.

If the user 110 takes their USB flash drive, then the interactive digital whiteboard 200 will initiate no further actions. If, however, the user 110 does not take their flash drive, the interactive digital whiteboard 200 can initiate other actions including, but not limited to, transmitting a message to the user 110 (e.g. if the user 110 provided an ownership declaration in the manner described above 120), transmitting a message to an organizer of a meeting scheduled at the interactive digital whiteboard 200 during the time of the user session, transmitting a message to a participant of a meeting scheduled at the interactive digital whiteboard 200 during the time of the user session, or transmitting a message to an administrator of the interactive digital whiteboard 200. The message can indicate that a personal device 112 was left at the interactive digital whiteboard 200 and request that the user retrieve the personal device 112.

As discussed above, the communal computing device 100 can select one or more actions to take with respect to personal device 112 based upon the session start signals 114 and/or the session end signals 122 associated with the previous user session. For instance, if the session start signal and session end signal were the start and end of a meeting scheduled at the communal computing device 100, respectively, the communal computing device 100 might transmit a message to an organizer of or participant in the meeting requesting that the user retrieve the personal device 112.

The communal computing device 100 can take other types of actions in other configurations in response to determining that a personal device 112 remains connected at the end of a user session. For example, and without limitation, the communal computing device 100 might encrypt the personal device 112 (i.e. in the case of storage device) and transmit the decryption password to the associated user or an administrator. As another example, the communal computing device 100 might block other users 110 from using a personal device 112 that remains connected at the conclusion of a user session.

In some configurations, an administrative user of the communal computing device 100 can specify a policy defining the actions to be taken with regard to different types of personal devices 112. For instance, the administrator might define a policy indicating that no action is to be taken with regard to keyboard or mouse user input devices but that notifications are to be provided in the event a storage device is left connected to the communal computing device 100 at the end of a user session.

An administrator of the communal computing device 100 might also be permitted to specify devices that are to be permanently connected to the communal computing device 100 and that are, therefore, exempt from the behavior described above. For example, an administrator might define a keyboard, mouse, or other type of user input device that is to remain connected to the communal computing device 100 even after the end of user sessions.

In order to define such a policy, the communal computing device 100 might provide a user interface through which an administrator or other type of authenticated user with sufficient privileges can approve a permanent connection to a personal device. Alternately, or in addition, an authorized user might be permitted to mark a personal device 112 as approved for permanent attachment to the communal computing device 100 when a reminder is presented by the communal computing device 100 to take a personal device 112 at the end of a user session. Personal devices 112 that were attached prior to configuring the device 100 for communal usage might be "grandfathered in" and treated as permanent devices without administrator intervention.

Figure 3A:
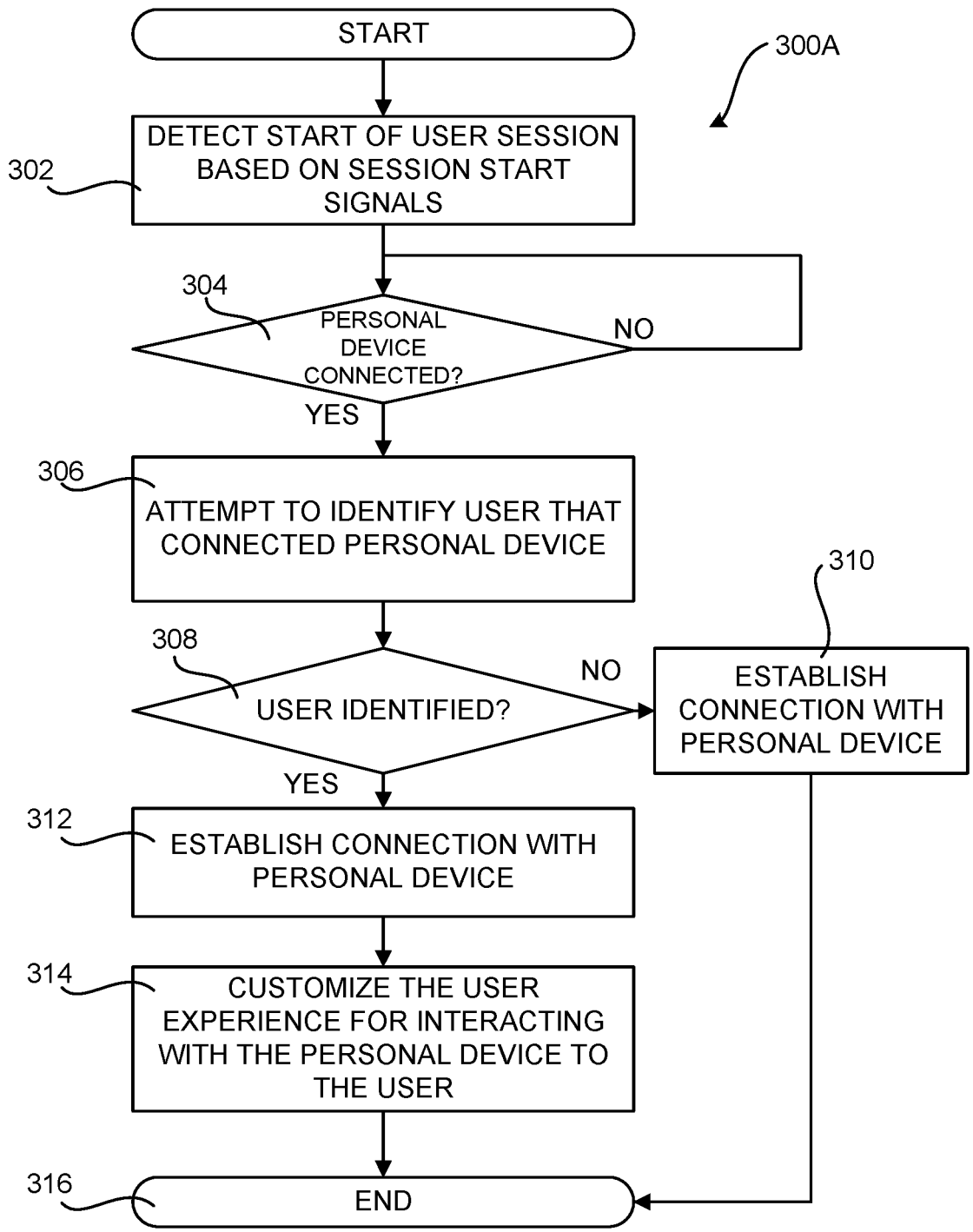
FIGS. 3A and 3B are flow diagrams showing routines that illustrate aspects of the operation of the communal computing device described with reference to FIGS. 1A-2C for detecting a start and an end of a user session and initiating actions with respect to personal devices connected at the end of a user session.
Figure 3B:
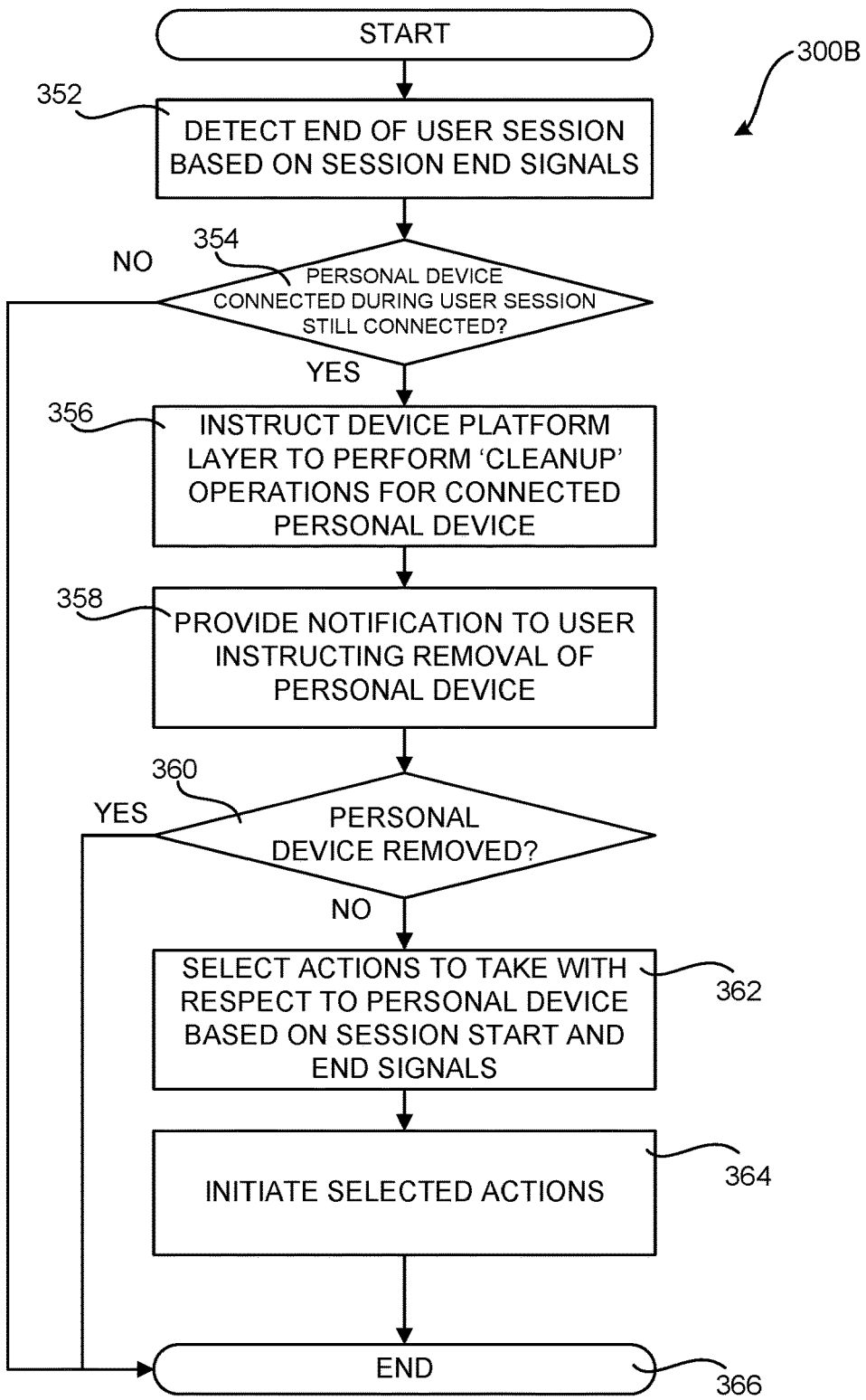

FIGS. 3A and 3B are flow diagrams showing routines 300A and 300B, respectively, that illustrate aspects of the operation of the communal computing device 100 described above with reference to FIGS. 1A-2C. It should be appreciated that the logical operations described herein with regard to FIGS. 3A and 3B, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300A shown in FIG. 3A illustrates aspects of the communal computing device 100 for detecting a start of a user session based upon session start signals 114. The routine 300A also illustrates aspects of the operation of the communal computing device 100 for customizing a user interface experience for users 110 that can be identified.

The routine 300A begins at operation 302, where the communal computing device 100 determines that a user session has started based upon the detection of a session start signal 114. As discussed above, session start signals 114 include, but are not limited to, an indication that a user has signed into a communal computing device, an indication that a user 110 has been detected in the vicinity of a communal computing device 100, biometric identification of a user 110 in the vicinity of a communal computing device 100, connection of a personal device 112, or an indication of the start time of a meeting scheduled at a communal computing device 100.

From operation 302, the routine 300A proceeds to operation 304, where the communal computing device 100 determines if a personal device 112 has been connected thereto following the start of a user session. If so, the routine 300A proceeds from operation 304 to operation 306. At operation 306, the communal computing device 100 might attempt to identify the user 110 that connected the personal device 112. The user 110 can self-identify in some configurations. In other configurations, the communal computing device 100 can utilize biometric signals (e.g. facial or fingerprint recognition) to identify the user 110 that connected the personal device 112.

As discussed above, it is not necessary that the communal computing device 100 identify a user 110 when a personal device 112 is connected. Accordingly, if the user 110 cannot be identified and, therefore, no association between the user 110 and the personal device 112 can be established, the routine 300A proceeds from operation 308 to operation 310, where a connection is established between the communal computing device 100 and the personal device 112. The routine 300A then proceeds from operation 310 to operation 316, where it ends.

If the communal computing device 100 can identify the user 110 that connected the personal device 112, the routine 300A proceeds from operation 308 to operation 312, where it establishes a connection with the personal device 112. The routine 300A then proceeds from operation 312 to operation 314, where the communal computing device 100 can customize the user experience for interacting with the personal device 112 for the user 110 that connected the personal device 112. The routine 300A then proceeds from operation 314 to operation 316, where it ends.

The routine 300B shown in FIG. 3B illustrates aspects of the communal computing device 100 for detecting the end of a user session using session end signals 122 and for initiating an action, or actions, in response to determining that a user session has ended. The routine 300B begins at operation 352, where the communal computing device 100 detects the end of a user session based upon detection of a session end signal 122. As discussed above, session end signals 122 include, but are not limited to, a request to clear a user workspace on a communal computing device 100, expiration of an inactivity timer, an indication that no users 110 are present in the vicinity of a communal computing device 110, or a signal indicating an end time of a meeting scheduled at a communal computing device 100.

From operation 352, the routine 300 proceeds to operation 354, where the communal computing device 100 determines whether a personal device 112 that was connected to the communal computing device 112 at the start of or during a user session is still connected to the communal computing device 100 at the end of the user session. If no personal device 112 remains connected to the communal computing device 100, then no actions need to be initiated and, accordingly, the routine 300 proceeds from operation 354 to operation 366, where it ends.

If a personal device 112 remains connected at the end of a user session, the routine 300B proceeds from operation 354 to operation 356. At operation 356, the operating system shell 106 can instruct the device platform layer 108 to perform a cleanup operation. As discussed above, this can include, for example, ejecting, unpairing, or otherwise disconnecting the personal device 112 from the communal computing device 100 to ensure that other, subsequent, users cannot access the personal device 112. The routine 300B then proceeds from operation 356 to operation 358, where the communal computing device 100 can provide a notification, such as within a GUI or voice user interface, reminding a user 110 to take their personal device 112.

From operation 358, the routine 300B proceeds to operation 360, where the communal computing device 100 determines if the personal device 112 has been removed. If the personal device 112 has been removed, the routine 300B proceeds from operation 360 to operation 366, where it ends. If not, the routine 300B proceeds from operation 360 to operation 362, where the communal computing device 100 selects one or more actions to take with respect to personal device 112 based upon the session start signals 114 and/or the session end signals 122 associated with the previous user session.

As discussed above, for example, the communal computing device 100 might transmit a message to an organizer of a meeting scheduled at the communal computing device during the time of the user session if the session start signals 114 indicated the start of a meeting and/or the session end signals 122 indicated the end of a meeting. The particular action, or actions, performed by the communal computing device 100 might also or alternately be selected based upon the identity of an authenticated user 110 associated with the personal device 112 or other factors.

From operation 362, the routine 300B proceeds to operation 364, where the actions selected at operation 362 are performed. The routine 300B then proceeds from operation 364 to operation 366, where it ends.

Figure 4:
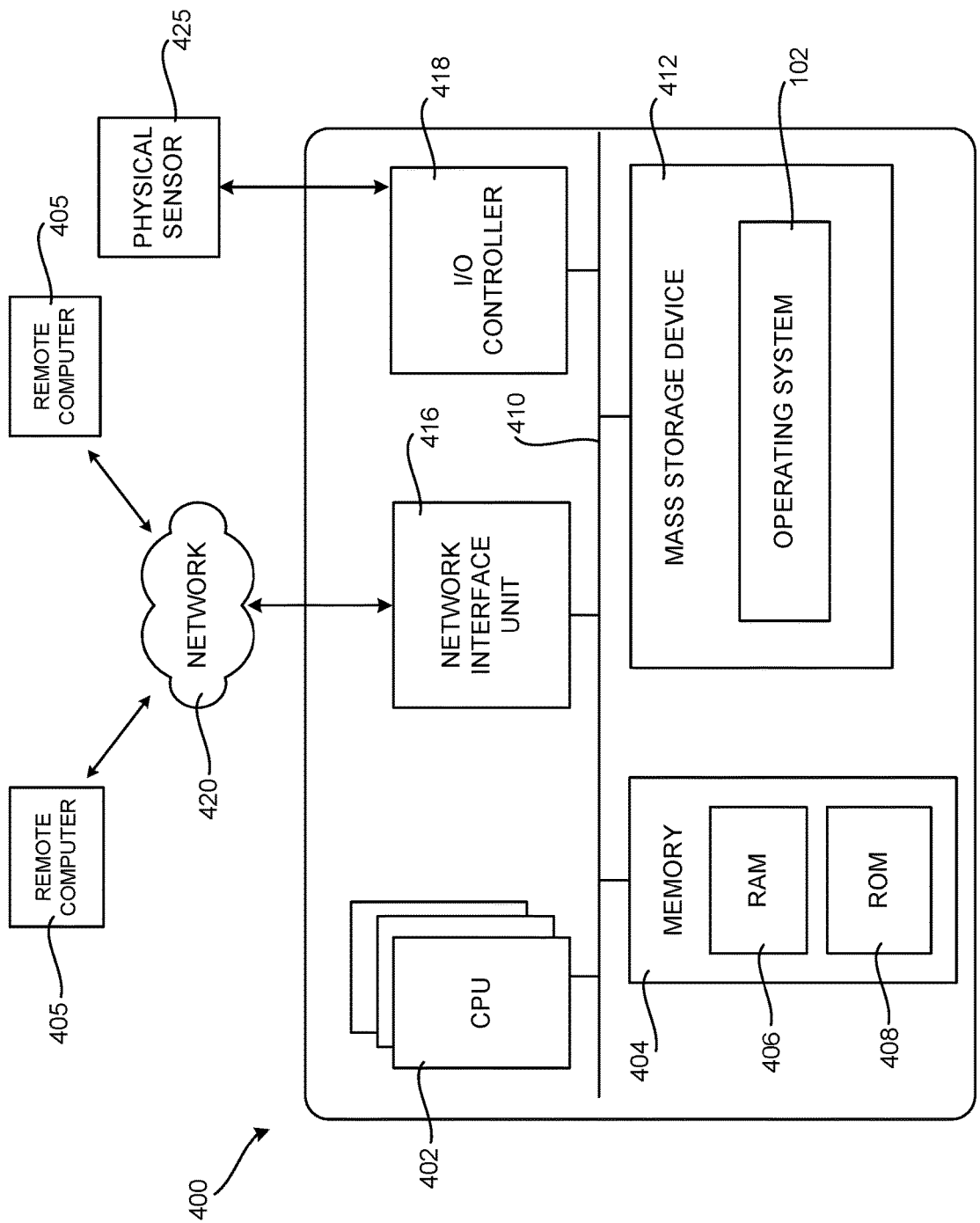
FIG. 4 is a computer architecture diagram showing an illustrative computer hardware and software architecture for a computing device that can implement aspects of the technologies presented herein.

FIG. 4 is a computer architecture diagram showing an illustrative computer hardware and software architecture for a computing device that can implement the various technologies presented herein. In particular, the architecture illustrated in FIG. 4 can be utilized to implement a communal computing device 100 such as an interactive digital whiteboard 200, server computer, mobile phone, e-reader, smartphone, desktop or laptop computer, AR/VR device, tablet computer, video game console, or another type of communal computing device.

The computer 400 illustrated in FIG. 4 includes a central processing unit 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, can be stored in the ROM 408. The computer 400 further includes a mass storage device 412 for storing an operating system 102, application programs, and other types of programs. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers 405 through a network such as the network 420. The computer 400 can connect to the network 420 through a network interface unit 416 connected to the bus 410. It should be appreciated that the network interface unit 416 can also be utilized to connect to other types of networks and remote computer systems. The computer 400 can also include an input/output controller 418 for receiving and processing input from a number of other devices, including a keyboard, mouse, touch input, an electronic stylus (not shown in FIG. 4), or a physical sensor 425 such as a video camera or fingerprint reader. Similarly, the input/output controller 418 can provide output to a display screen or other type of output device (also not shown in FIG. 4).

It should be appreciated that the software components described herein, when loaded into the CPU 402 and executed, can transform the CPU 402 and the overall computer 400 from a general-purpose computing device into a special-purpose computing device customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Figure 5:
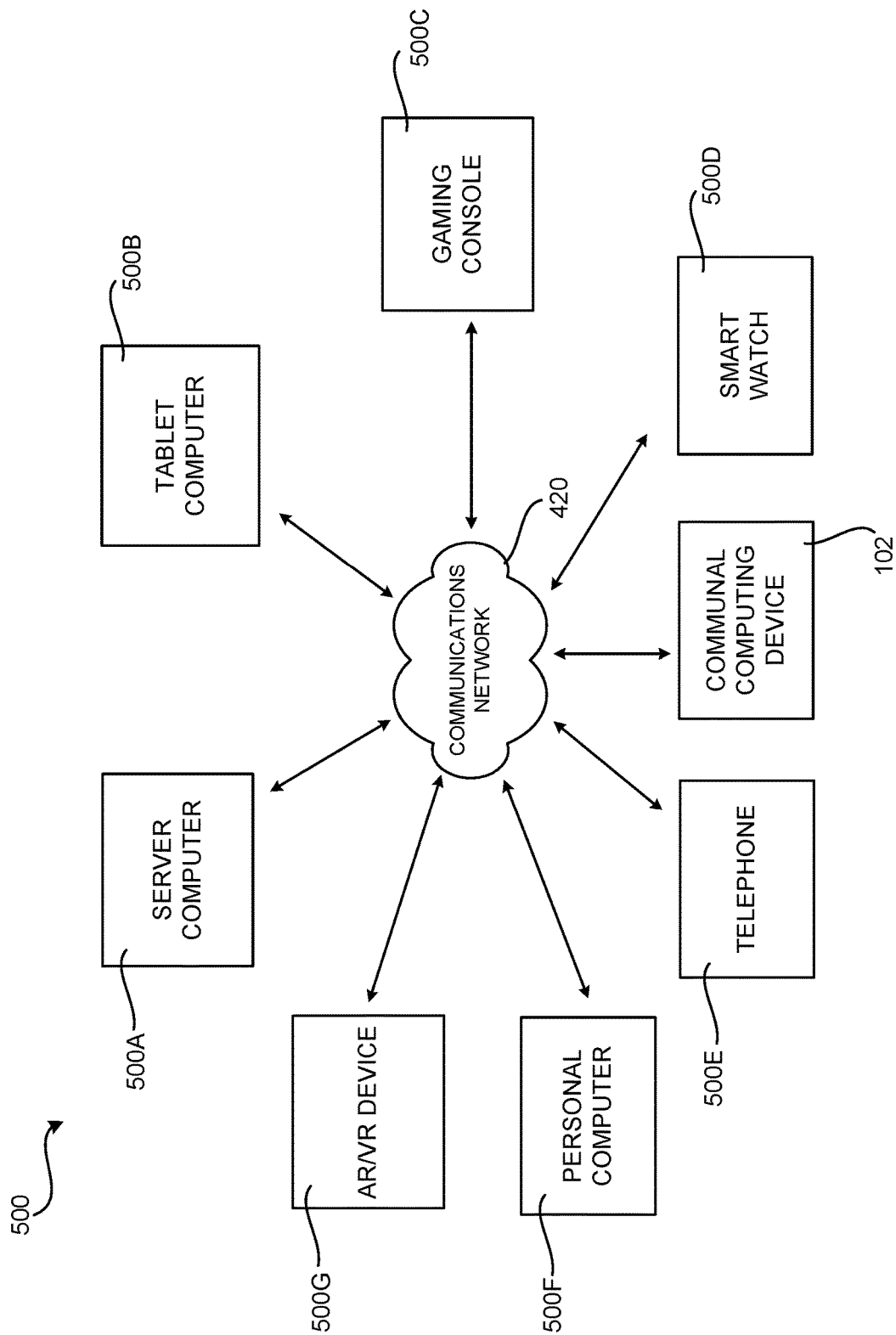
FIG. 5 is a network diagram illustrating a distributed computing environment in which aspects of the disclosed technologies can be implemented.

FIG. 5 is a network diagram illustrating a distributed network computing environment 500 in which aspects of the disclosed technologies can be implemented, according to various configurations presented herein. As shown in FIG. 5, one or more server computers 500A can be interconnected via a communications network 420 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a communal computing device 100, server computer 500A, tablet computer 500B, gaming console 500C, smartwatch 500D, telephone 500E, such as a smartphone, a personal computer 500F, and an AR/VR device 500G.

In a network environment in which the communications network 420 is the Internet, for example, the server computer 500A can be a dedicated server computer operable to process and communicate data to and from the client computing devices 500B-500G and the communal computing device 100 via any of a number of known protocols, such as, hypertext transfer protocol ("HTTP"), file transfer protocol ("FTP"), or simple object access protocol ("SOAP"). Additionally, the networked computing environment 500 can utilize various data security protocols such as secured socket layer ("SSL") or pretty good privacy ("PGP"). Each of the client computing devices 500B-500G and the communal computing device 100 can be equipped with an operating system operable to support one or more computing applications or terminal sessions such as a web browser (not shown in FIG. 5), or other graphical user interface (not shown in FIG. 5), or a mobile desktop environment (not shown in FIG. 5) to gain access to the server computer 500A.

The server computer 500A can be communicatively coupled to other computing environments (not shown in FIG. 5) and receive data regarding a participating user's interactions/resource network. In an illustrative operation, a user (not shown in FIG. 5) may interact with a computing application running on a client computing device 500B-500G or the communal computing device 100 to obtain desired data and/or perform other computing applications.

The data and/or computing applications may be stored on the server 500A, or servers 500A, and communicated to cooperating users through the client computing devices 500B-500G or the communal computing device 100 over an exemplary communications network 420. A participating user (not shown in FIG. 5) may request access to specific data and applications housed in whole or in part on the server computer 500A. These data may be communicated between the client computing devices 500B-500G and the communal computing device 100 and the server computer 500A for processing and storage.

The server computer 500A can host computing applications, processes and applets for the generation, authentication, encryption, and communication of data and applications, and may cooperate with other server computing environments (not shown in FIG. 5), third party service providers (not shown in FIG. 5), network attached storage ("NAS") and storage area networks ("SAN") to realize application/data transactions.

It should be appreciated that the computing architecture shown in FIG. 4 and the distributed network computing environment shown in FIG. 5 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1: A computer-implemented method, comprising: detecting, based on one or more session start signals, a start of a user session at a communal computing device; detecting, based on one or more session end signals, an end of the user session at the communal computing device; determining, following the end of the user session, whether a personal device connected to the communal computing device at the start of the user session or during the user session was connected to the communal computing device at the end of the user session; and responsive to determining that a personal device connected to the communal computing device at the start of the user session or during the user session was connected to the communal computing device at the end of the user session, initiating one or more actions, the one or more actions selected based, at least in part, on the one or more session start signals or the one or more session end signals.

Clause 2: The computer-implemented method of clause 1, wherein the one or more session start signals comprise one or more of an indication that a user has signed into the communal computing device, an indication that a user has been detected in a vicinity of the communal computing device, biometric identification of a user in the vicinity of the communal computing device, connection of the personal device, or an indication of a start time of a meeting scheduled at the communal computing device.

Clause 3: The computer-implemented method of any of clauses 1-2, wherein the one or more session end signals comprise one or more of a request to clear a user workspace, expiration of an inactivity timer, an indication that no users are present in a vicinity of the communal computing device, or a signal indicating an end time of a meeting scheduled at the communal computing device.

Clause 4: The computer-implemented method of any of clauses 1-3, wherein the one or more actions comprise one or more of restricting access to the personal device, transmitting a message to an organizer of a meeting scheduled at the communal computing device, transmitting a message to a participant of a meeting scheduled at the communal computing device, transmitting a message to an administrator of the communal computing device, or generating a notification at the communal computing device.

Clause 5: The computer-implemented method of any of clauses 1-4, wherein the personal device comprises a storage device, a user input device, or a wireless device.

Clause 6: The computer-implemented method of any of clauses 1-5, further comprising: receiving a request to connect the personal device to the communal computing device after the start of the user session; responsive to receiving the request to connect the personal device and prior to establishing a connection to the personal device, identifying a user associated with the personal device; and storing data comprising an identity of the user associated with the personal device, and wherein the one or more actions are selected based, at least in part, on the identity of the user associated with the personal device.

Clause 7: The computer-implemented method of any of clauses 1-6, further comprising customizing a user interface provided by the communal computing device relating to the personal device based, at least in part, on the identity of the user associated with the personal device.

Clause 8: A communal computing device comprising: one or more processors; and at least one computer storage medium having computer executable instructions stored thereon which, when executed by the one or more processors, cause the communal computing device to: detect, based on one or more session start signals, a start of a user session at a communal computing device; detect the connection of a personal device to the communal computing device at the start of the user session or during the user session; detect, based on one or more session end signals, an end of the user session at the communal computing device; determine, following the end of the user session, whether the personal device was connected to the communal computing device at the end of the user session; and responsive to determining that the personal device was connected to the communal computing device at the end of the user session, initiating one or more actions, the one or more actions selected based, at least in part, on the one or more session start signals or the one or more session end signals.

Clause 9: The computing device of clause 8, wherein the one or more session start signals comprise one or more of an indication that a user has signed into the communal computing device, an indication that a user has been detected in a vicinity of the communal computing device, biometric identification of a user in the vicinity of the communal computing device, connection of the personal device, or an indication of a start time of a meeting scheduled at the communal computing device.

Clause 10: The computing device of any of clauses 8-9, wherein the one or more session end signals comprise one or more of a request to clear a user workspace, expiration of an inactivity timer, an indication that no users are present in a vicinity of the communal computing device, or a signal indicating an end time of a meeting scheduled at the communal computing device.

Clause 11: The computing device of any of clauses 8-10, wherein the one or more actions comprise one or more of restricting access to the personal device, transmitting a message to an organizer of a meeting scheduled at the communal computing device, transmitting a message to a participant of a meeting scheduled at the communal computing device, transmitting a message to an administrator of the communal computing device, or generating a notification at the communal computing device.

Clause 12: The computing device of any of clauses 8-11, wherein the personal device comprises a storage device, a user input device, or a wireless device.

Clause 13: The computing device of any of clauses 8-12, wherein the at least one computer storage medium has further computer executable instructions stored thereon to: receive a request to connect the personal device to the communal computing device after the start of the user session; responsive to receiving the request to connect the personal device and prior to establishing a connection to the personal device, identify a user associated with the personal device; and store data defining an identity of the user associated with the personal device, and wherein the one or more actions are selected based, at least in part, on the identity of the user associated with the personal device.

Clause 14: The computing device of any of clauses 8-13, wherein the at least one computer storage medium has further computer executable instructions stored thereon to customize a user interface provided by the communal computing device relating to the personal device based, at least in part, on the identity of the user associated with the personal device.

Clause 15: At least one computer storage medium having computer executable instructions stored thereon which, when executed by one or more processors, cause a communal computing device to: detect, based on one or more session start signals, a start of a user session at the communal computing device; detect the connection of a personal device to the communal computing device at the start of the user session or during the user session; detect, based on one or more session end signals, an end of the user session at the communal computing device; determine, following the end of the user session, whether the personal device was connected to the communal computing device at the end of the user session; and responsive to determining that the personal device was connected to the communal computing device at the end of the user session, initiating one or more actions, the one or more actions selected based, at least in part, on the one or more session start signals or the one or more session end signals.

Clause 16: The at least one computer storage medium of clause 15, wherein the one or more session start signals comprise one or more of an indication that a user has signed into the communal computing device, an indication that a user has been detected in a vicinity of the communal computing device, biometric identification of a user in the vicinity of the communal computing device, connection of the personal device, or an indication of a start time of a meeting scheduled at the communal computing device.

Clause 17: The at least one computer storage medium of any of clauses 15-16, wherein the one or more session end signals comprise one or more of a request to clear a user workspace, expiration of an inactivity timer, an indication that no users are present in a vicinity of the communal computing device, or a signal indicating an end time of a meeting scheduled at the communal computing device.

Clause 18: The at least one computer storage medium of any of clauses 15-17, wherein the one or more actions comprise one or more of restricting access to the personal device, transmitting a message to an organizer of a meeting scheduled at the communal computing device, transmitting a message to a participant of a meeting scheduled at the communal computing device, transmitting a message to an administrator of the communal computing device, or generating a notification at the communal computing device.

Clause 19: The at least one computer storage medium of any of clauses 15-18, having further computer executable instructions stored thereon to: receive a request to connect the personal device to the communal computing device after the start of the user session; responsive to receiving the request to connect the personal device and prior to establishing a connection to the personal device, identify a user associated with the personal device; and store data defining an identity of the user associated with the personal device, and wherein the one or more actions are selected based, at least in part, on the identity of the user associated with the personal device.

Clause 20: The at least one computer storage medium of any of clauses 15-19, having further computer executable instructions stored thereon to customize a user interface provided by the communal computing device relating to the personal device based, at least in part, on the identity of the user associated with the personal device.

Based on the foregoing, it should be appreciated that technologies for scoping the lifetime of personal devices connected to communal computing devices based on user sessions have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   detecting, based on one or more session start signals, a start of a user session at a communal computing device;
   determining that a personal device has been connected to the communal computing device at the start of the user session or during the user session;
   responsive to the personal device being connected to the communal computing device, causing the communal computing device to expose a user interface that is configured to prompt a user to provide an ownership declaration that associates a user identity with the personal device;
   receiving, via the user interface that is exposed responsive to the personal device being connected to the communal computing device, the ownership declaration that associates the user identity with the personal device that is connected to the communal computing device at the start of the user session or during the user session;
   detecting, based on one or more session end signals, an end of the user session at the communal computing device;
   determining, following the end of the user session, whether the personal device connected to the communal computing device at the start of the user session or during the user session remained connected to the communal computing device at the end of the user session; and
   responsive to determining that the personal device connected to the communal computing device at the start of the user session or during the user session remained connected to the communal computing device at the end of the user session, transmitting a message to one or more user accounts, wherein:
   the message includes an indication of the user identity associated with the personal device by the ownership declaration received via the user interface that is exposed responsive to the personal device being connected to the communal computing device; and
   at least one of the one or more user accounts to which the message is transmitted belongs to an organizer of a meeting scheduled at the communal computing device, a participant of the meeting scheduled at the communal computing device, or an administrator of the communal computing device.

2. The computer-implemented method of claim 1, wherein the one or more session start signals comprise one or more of: an indication that the user has signed into the communal computing device, an indication that the user has been detected in a vicinity of the communal computing device, biometric identification of the user in the vicinity of the communal computing device, connection of the personal device, or an indication of a start time of a meeting scheduled at the communal computing device.

3. The computer-implemented method of claim 1, wherein the one or more session end signals comprise one or more of: a request to clear a user workspace at the communal computing device, expiration of an inactivity timer at the communal computing device, an indication that no users are present in a vicinity of the communal computing device, or a signal indicating an end time of a meeting scheduled at the communal computing device.

4. The computer-implemented method of claim 1, wherein the personal device comprises a storage device, a user input device, or a wireless device.

5. The computer-implemented method of claim 1, wherein the receiving the ownership declaration comprises:
   receiving a request to connect the personal device to the communal computing device after the start of the user session;
   responsive to receiving the request to connect the personal device and prior to establishing a connection to the personal device, exposing the user interface that is configured to prompt the user to provide the ownership declaration that associates the user identity with the personal device; and
   storing data comprising the user identity associated with the personal device.

6. The computer-implemented method of claim 5, further comprising customizing a user interface provided by the communal computing device relating to the personal device based, at least in part, on the user identity associated with the personal device.

7. A communal computing device comprising:
   one or more processors; and
   at least one computer storage medium having computer executable instructions stored thereon which, when executed by the one or more processors, cause the communal computing device to:
   detect, based on one or more session start signals, a start of a user session at a communal computing device;
   detect a connection of a personal device to the communal computing device at the start of the user session or during the user session;
   expose, in response to detecting the connection of the personal device to the communal computing device, a user interface that is configured to prompt a user to provide an ownership declaration that associates a user identity with the personal device;
   receive, via the user interface that is exposed in response to detecting the connection of the personal device to the communal computing device, the ownership declaration that associates the user identity with the personal device that is connected to the communal computing device at the start of the user session or during the user session;
   detect one or more session end signals that are indicative of an end of the user session at the communal computing device;
   determine, subsequent to detecting the one or more session end signals that are indicative of the end of the user session, whether the personal device remained connected to the communal computing device at the end of the user session; and
   responsive to determining that the personal device remained connected to the communal computing device at the end of the user session, transmitting a message to one or more user accounts, wherein:
   the message includes an indication of the user identity associated with the personal device by the ownership declaration; and
   at least one of the one or more user accounts to which the message is transmitted belongs to an organizer of a meeting scheduled at the communal computing device, a participant of the meeting scheduled at the communal computing device, or an administrator of the communal computing device.

8. The communal computing device of claim 7, wherein the one or more session start signals comprise one or more of: an indication that the user has signed into the communal computing device, an indication that the user has been detected in a vicinity of the communal computing device, biometric identification of the user in the vicinity of the communal computing device, connection of the personal device, or an indication of a start time of a meeting scheduled at the communal computing device.

9. The communal computing device of claim 7, wherein the one or more session end signals comprise one or more of: a request to clear a user workspace at the communal computing device, expiration of an inactivity timer at the communal computing device, an indication that no users are present in a vicinity of the communal computing device, or a signal indicating an end time of a meeting scheduled at the communal computing device.

10. The communal computing device of claim 7, wherein the personal device comprises a storage device, a user input device, or a wireless device.

11. The communal computing device of claim 7, wherein the at least one computer storage medium has further computer executable instructions stored thereon to cause the communal computing device to:
   receive a request to connect the personal device to the communal computing device after the start of the user session;
   responsive to receiving the request to connect the personal device and prior to establishing a connection to the personal device, expose the user interface that is configured to prompt the user to provide the ownership declaration; and
   store data defining the user identity associated with the personal device.

12. The communal computing device of claim 11, wherein the at least one computer storage medium has further computer executable instructions stored thereon to cause the communal computing device to customize a user interface provided by the communal computing device relating to the personal device based, at least in part, on the user identity associated with the personal device.

13. At least one computer storage medium having computer executable instructions stored thereon which, when executed by one or more processors, cause a communal computing device to:
   detect, based on one or more session start signals, a start of a user session at the communal computing device;
   detect a connection of a personal device to the communal computing device at the start of the user session or during the user session;
   expose, in response to detecting the connection of the personal device to the communal computing device, a user interface that is configured to prompt a user to provide an ownership declaration that associates a user identity with the personal device;
   receive, via the user interface that is exposed in response to detecting the connection of the personal device to the communal computing device, the ownership declaration that associates the user identity with the personal device that is connected to the communal computing device at the start of the user session or during the user session;
   detect, based on one or more session end signals, an end of the user session at the communal computing device;
   determine, following the end of the user session, whether the personal device was connected to the communal computing device at the end of the user session; and
   responsive to determining that the personal device was connected to the communal computing device at the end of the user session, transmit a message to one or more user accounts, wherein:
      the message includes an indication of the user identity associated with the personal device by the ownership declaration; and
      at least one of the one or more user accounts to which the message is transmitted belongs to an organizer of a meeting scheduled at the communal computing device, a participant of the meeting scheduled at the communal computing device, or an administrator of the communal computing device.

14. The at least one computer storage medium of claim 13, wherein the one or more session start signals comprise one or more of: an indication that the user has signed into the communal computing device, an indication that the user has been detected in a vicinity of the communal computing device, biometric identification of the user in the vicinity of the communal computing device, connection of the personal device, or an indication of a start time of a meeting scheduled at the communal computing device.

15. The at least one computer storage medium of claim 14, wherein the one or more session end signals comprise one or more of: a request to clear a user workspace at the communal computing device, expiration of an inactivity timer at the communal computing device, an indication that no users are present in a vicinity of the communal computing device, or a signal indicating an end time of a meeting scheduled at the communal computing device.

16. The at least one computer storage medium of claim 13, having further computer executable instructions stored thereon to cause the communal computing device to:
   receive a request to connect the personal device to the communal computing device after the start of the user session;
   responsive to receiving the request to connect the personal device and prior to establishing a connection to the personal device, expose the user interface that is configured to prompt the user to provide the ownership declaration associated with the personal device; and
   store data defining the user identity of the user associated with the personal device, and wherein the one or more actions are selected based, at least in part, on the user identity of the user associated with the personal device.

17. The at least one computer storage medium of claim 16, having further computer executable instructions stored thereon to cause the communal computing device to customize a user interface provided by the communal computing device relating to the personal device based, at least in part, on the user identity associated with the personal device.

* * * * *